(12) United States Patent
Lescourret (10) Patent No.: US 7,285,951 B2
(45) Date of Patent: Oct. 23, 2007

(54) METHOD AND DEVICE FOR MAGNETIC MEASUREMENT OF THE POSITION AND ORIENTATION OF A MOBILE OBJECT RELATIVE TO A FIXED STRUCTURE

(75) Inventor: Jean-Louis Lescourret, Merignac (FR)

(73) Assignee: Thales, Neuilly-sur Seine (FR)

( * ) Notice: Subject to any disclaimer, the term of this patent is extended or adjusted under 35 U.S.C. 154(b) by 205 days.

(21) Appl. No.: 10/539,770

(22) PCT Filed: Dec. 20, 2002

(86) PCT No.: PCT/FR02/04507

§ 371 (c)(1),
(2), (4) Date: Jun. 20, 2005

(87) PCT Pub. No.: WO2004/065896

PCT Pub. Date: Aug. 5, 2004

(65) Prior Publication Data

US 2006/0181271 A1    Aug. 17, 2006

(51) Int. Cl.
G01B 7/004 (2006.01)
G01B 7/30 (2006.01)
G01S 3/02 (2006.01)

(52) U.S. Cl. .................................. 324/207.17; 342/450
(58) Field of Classification Search ........... 324/207.15, 324/207.17, 207.22, 207.23, 207.24, 207.25, 324/207.26, 207.16; 342/386, 448, 450
See application file for complete search history.

(56) References Cited

U.S. PATENT DOCUMENTS 5,646,525 A    7/1997  Gilboa
5,694,041 A    12/1997 Lescourret
5,847,976 A    12/1998 Lescourret
5,857,777 A    1/1999  Schuh
6,754,609 B2   6/2004  Lescourret
6,894,490 B2   5/2005  Lescourret
7,096,148 B2 * 8/2006  Anderson et al. ........... 702/134

FOREIGN PATENT DOCUMENTS

EP    1 014 061 A    6/2000
WO    01 79778 A     10/2001

* cited by examiner

Primary Examiner—Edward Lefkowitz
Assistant Examiner—Kenneth J Whittington
(74) Attorney, Agent, or Firm—Lowe Hauptman & Berner, LLP (57) ABSTRACT

A method and device for magnetic measurement of the position and orientation of a mobile object relative to a fixed structure. The device comprises, Integral with the structure, a magnetic fields emitter assembly having three orthogonal emission coils defining a reference frame and a sensor assembly, integral with the mobile object, having three channels for measuring the field received on three orthogonal detection coils, these channels each incorporating a feedback loop providing an output voltage and a measurement current. A calibration voltage, at frequencies differing from the useful frequencies of the fields, is injected into the channels of the sensor without disturbing the continuous measurement by measurement acquisition channels, while a calibration current is superimposed on the measurement resistors. It is thus possible to identify the variable components of the system and correct the measurements through the inverse of the respective transfer functions of the channels of the sensor.

7 Claims, 5 Drawing Sheets

__METHOD AND DEVICE FOR MAGNETIC MEASUREMENT OF THE POSITION AND ORIENTATION OF A MOBILE OBJECT RELATIVE TO A FIXED STRUCTURE__

CROSS-REFERENCE TO RELATED APPLICATIONS

The present Application is based on International Application No. PCT/FR2002/004507, filed on Dec. 20, 2002, and priority is hereby claimed under 35 USC 119 based on this application.

1. Field of the Invention

The present invention pertains to the precise measurement of magnetic fields and more particularly to the determination of the position and the orientation of a mobile object with respect to a fixed structure.

In particular, the invention relates to the determination of the posture of the helmet of a pilot of military aircraft, in which the angular position of a target is determined by aiming, through a system comprising the pilot's helmet VDU.

2. Description of Related Art

The operation of such a system is recalled briefly below: via an ancillary collimator device, the pilot sees, through his semi-reflecting visor secured to the helmet, on the viewing axis, the image of a reticle projected to infinity superimposed with the outside scene. When he wishes to designate a target, the pilot makes this reticle coincide with the target and signals that coincidence is achieved, by means for example of a push-button control provided for this purpose.

Provided that the exact angular position of the helmet is referenced at the moment that coincidence is signaled, it is possible to determine, with respect to the aircraft, the direction of aim and to designate the objective to a weapon system, or to point an optical system for example in this direction.

A device for measuring orientation and position of the helmet of the pilot in a reference frame tied to the aircraft can consist of an orientation and position sensor made up of three orthogonal electromagnetic coils and placed on the helmet, and of an emitter, situated at a fixed point of the cabin, and made up of three other electromagnetic coils.

The method then consists in passing an electric current through each coil of the emitter (forming a substantially orthogonal fixed trihedron). These currents engender three magnetic fields which are sensed by the coils of the sensor (forming a substantially orthogonal moving trihedron tied to the helmet). The analysis of these magnetic fields makes it possible to determine the position and the orientation of the moving trihedron with respect to the fixed trihedron.

In this domain of application in particular, it is vital to obtain an accurate measurement of the magnetic fields emitted by the fixed emitter, and detected by the sensor tied to the helmet, so as to accurately designate, to a weapon system, the objective selected by the pilot.

Hitherto, components of high accuracy, sometimes thermostatically controlled, which are able to operate within a wide time duration, have been used for this measurement.

A drawback of this prior art technique is that, even with components of high quality and hence of very high complexity and very high cost, it is difficult to attain the very high accuracy required by this domain of application.

Another drawback of this prior art technique is that, even with components of high quality and of very high cost, it is difficult to maintain a high level of accuracy over time, on account of the aging of the components.

Calibration techniques have been proposed, in order to limit these drawbacks. However, the calibration phases presuppose, according to these techniques, the temporary interruption of emission, and hence of the operation of the sensor. This interruption is not acceptable in numerous situations (decrease in the signal-to-noise ratio), and in particular in the case discussed above of military equipment, where the signal-to-noise ratio must necessarily be optimized so as to thereby obtain the maximum accuracy.

The applicant has conceived of a much more advantageous calibration technique by virtue of which the magnetic field measurement can operate in a continuous manner and does not require any preliminary and/or periodic calibration phase during which the measurement would be interrupted.

In a magnetic field measurement device comprising at least one measurement acquisition chain, provision is made according to this technique to implement calibration signals which are superimposed on the signals to be measured and which exhibit spectral components at frequencies distinct from those of the useful signals. It is thus easily possible to calculate an estimate of an electrical quantity representative of the measurement chain, on the basis of the calibration parameters, without interrupting the measurement, in such a way as to eliminate the uncertainties of measurement and/or the dependence of the measurement on slowly varying parameters, known with insufficient or unknown accuracy, such as for example the resistors for measuring current and the transfer functions of measurement chains. The transfer function or the calibration output voltage of the chain is preferably chosen as representative electrical quantity.

However, this technique takes account only of the calibration of the measurement acquisition chains but not the calibration of the transfer functions of the channels of the sensor.

SUMMARY OF THE INVENTION

The subject of the invention is therefore a method and a device for magnetic measurement implementing a complete calibration making it possible to accurately ascertain the complex amplitude of the magnetic fields to be measured.

In a general manner, if we denote by $$[\vec{B}_c(j\omega)]$$

the fields resulting in the sensor frame from the fields emitted by the emitter, the measurements at the outputs of the channels of the sensor may be written:

$$[\vec{M}(j\omega)] = T(j\omega)[\vec{B}_c(j\omega)]$$

where ω in fact represents a set of mutually distinct frequency terms that are integer multiples of a term $$\omega_0 = \frac{2\pi}{T_{obs}}$$

(with $T_{obs}$ duration of a measurement cycle), respectively emitted by the emission channels and where T(jω) is a matrix whose terms represent the transfer functions relating outputs and inputs of the sensor. The diagonal terms of $T(j\omega)$ are therefore the transfer functions of each channel of the sensor and the off-diagonal terms represent the inter-channel coupling terms. These off-diagonal terms are small by construction of the sensor and will be neglected in the subsequent description of the invention although the method may be applied in the same manner.

To be able to accurately model $$[\overset{\rho}{B_c}(j\omega)],$$

it is therefore necessary to accurately ascertain the complex terms of the matrix $T(j\omega)$ as a function of the angular frequency, in terms of amplitude and phase.

The subject of the invention is a method and a device whose principle relies on the injection of calibration signals superimposed with useful signals, which do not modify the estimate of these useful signals and which are perfectly discernible and measured without error, then on the identification of the transfer function of the sensor so as to correct the measurements by the inverse of the complex transfer function of the corresponding channel.

According to the invention, there is therefore provided a method of magnetic measurement of the position and the orientation of a mobile object with respect to a fixed structure, in which a first emitter assembly includes at least two orthogonal coils for emitting magnetic fields, integral with said fixed structure, which define a reference frame, and means of emission for injecting predetermined emission currents into said coils at first frequencies, in which a second sensor assembly includes at least two orthogonal coils for detecting magnetic fields, integral with said mobile object, sensor channels with servocontrol loops for producing in feedback coils coupled to said detection coils feedback magnetic fields by injection of measurement currents and a calibration channel for elaborating at least one calibration voltage, and in which at least one acquisition channel is provided for extracting measurement values of said emission channels, said sensor channels and said calibration channel and means of calculation and of processing estimate, on the basis of said measurement values, the magnetic fields detected in the second sensor assembly and deduce therefrom the position and the orientation of said mobile object in said reference frame, said method being characterized in that said calibration voltage comprises only terms with at least two frequencies distinct from said first frequencies and in that said method comprises a step of injecting calibration currents and voltages into said channels of the sensor so as to produce calibration measurement values identified by their frequency, a step of estimating by the means of calculation the transfer function of each of the sensor channels and a step of deducing by said means of calculation the magnetic fields detected on the basis of said measurement values and of the inverse of said estimated transfer functions.

The invention also provides for such a method in which the servocontrol loops of the sensor channels provide output voltages producing said measurement currents and said measurement currents flow through measurement resistors so as to provide measurement voltages, characterized in that the calibration voltage is superimposed on said output voltages for the production of said measurement currents, and in that said step of estimating the transfer functions is performed, on the basis of the separation of the calibration frequency terms in said output voltages, by polynomial approximation for said first frequencies.

According to another aspect of the invention, there is provided a device for the magnetic measurement of the position and the orientation of a mobile object with respect to a fixed structure, of the type comprising:

a first emitter assembly including at least two orthogonal coils for emitting magnetic fields, integral with said fixed structure and defining a reference frame, and means of emission for injecting predetermined currents into said coils at first frequencies and constituting with said coils at least two emission channels;

a second sensor assembly including at least two orthogonal coils for detecting magnetic fields, integral with said mobile object, means of measurement by servocontrol loops, for producing in feedback coils coupled to said detection coils feedback magnetic fields by injection of measurement currents and for constituting with said detection coils at least two sensor channels, and means of calibration comprising a calibration channel for elaborating at least one calibration voltage at second frequencies;

at least one acquisition channel for measurements for extracting measurement values of said emission channels, said sensor channels and said calibration channel; and means of calculation and processing for estimating, on the basis of said measurement values, the magnetic fields detected in the second sensor assembly and deducing therefrom the position and the orientation of said mobile object in said reference frame, characterized in that said second frequencies are distinct from said first frequencies, in that said means of calibration are provided so as to inject calibration currents and voltages into said sensor channels so as to produce calibration measurement values identified by their frequencies and addressed to said means of calculation by the acquisition channel or channels and in that said means of calculation and processing are provided so as to estimate the transfer function of each of the sensor channels and to deduce the magnetic fields detected from said measurement values and from the inverse of said estimated transfer functions.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The invention will be better understood and other characteristics and advantages will become apparent with the aid of the description hereinbelow and of the appended drawings where.

DETAILED DESCRIPTION OF THE INVENTION

Figure 1:
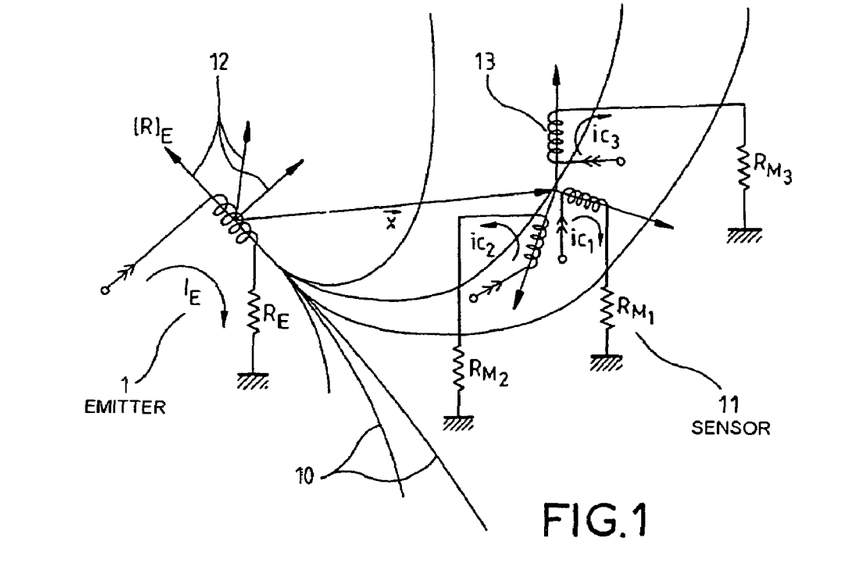
FIG. 1 is a basic diagram of a device of the type implemented in a helmet sight.

As briefly explained hereinabove, the invention relates to the accurate magnetic measurement of the position and the orientation of a mobile object with respect to a fixed structure. FIG. 1 is a basic diagram of such a device.

The object thereof consists in determining the position and the orientation of a magnetic sensor 11 in the orthonormal reference frame $[R]_E$ 12 formed by the 3 coils of an emitter 1 of magnetic field $$\overset{\rho}{B_E}(\overset{\rho}{x}).$$

It will be noted, for the sake of clarity and simplification, that only one emission coil has been represented in FIG. 1. The generalization to three coils is immediate.

At the point $$\overset{\rho}{x},$$

which indicates the position of the sensor 11 in the reference frame $[R]_E$, the induction $$\overset{\rho}{B_E}(\overset{\rho}{x})$$

is projected onto the 3 axes of the detection and feedback coils 13 of the sensor. The feedback currents $i_{c1}$, $i_{c2}$ and $i_{c3}$ implemented in the sensor 11 cancel out these projections, through a servocontrol process known to the person skilled in the art. $i_{c1}$, $i_{c2}$ and $i_{c3}$ therefore represent the measurements of magnetic induction along the directions of the axes of the sensor.

Specifically, for an emission on a single coil such as represented in FIG. 1, it is known that at a point $$\overset{\rho}{x}$$

in space, for an orthonormal emitter and an orthonormal sensor, the sensor 11 measures:

$$\begin{pmatrix} i_{c1} \\ i_{c2} \\ i_{c3} \end{pmatrix} = k \, [R'_{C/E}] \begin{pmatrix} f_1(\overset{\rho}{x}) \\ f_2(\overset{\rho}{x}) \\ f_3(\overset{\rho}{x}) \end{pmatrix} i_E \quad (1)$$

where $R'_{C/E}$ is the transposed matrix of the matrix for switching from the emitter frame of reference to the sensor frame of reference, and formed of the unit vectors of the sensor axes expressed in the emitter frame of reference and k a proportionality term dependent on the units chosen, $$f_1(\overset{\rho}{x}), f_2(\overset{\rho}{x}), f_3(\overset{\rho}{x})$$

being the components of $$\overset{\rho}{B_E}(\overset{\rho}{x})$$

at the point $\overset{\rho}{x}$ in the frame of reference 12 $[R]_E$ formed by the emitter 1 for a unit emission current.

By taking the ratios $$\frac{i_{c1}}{i_E}, \frac{i_{c2}}{i_E}, \frac{i_{c3}}{i_E}$$

(where $i_E$ is the emission current), only the information regarding position $$\overset{\rho}{x}$$

and rotation X, Y, Z of the sensor 11 still remains in the expression for the measurement (1) above. In the more general case of three emissions along the three axes of the emitter, the obtaining of the 3×3 matrix of generic term $i_{ci}/i_{Ej}$, where i and j are indices of value 1 to 3, therefore affords easy access to the orientation and to the position of the sensor 11 in the frame of reference 12 of the emitter 1.

Figure 2:
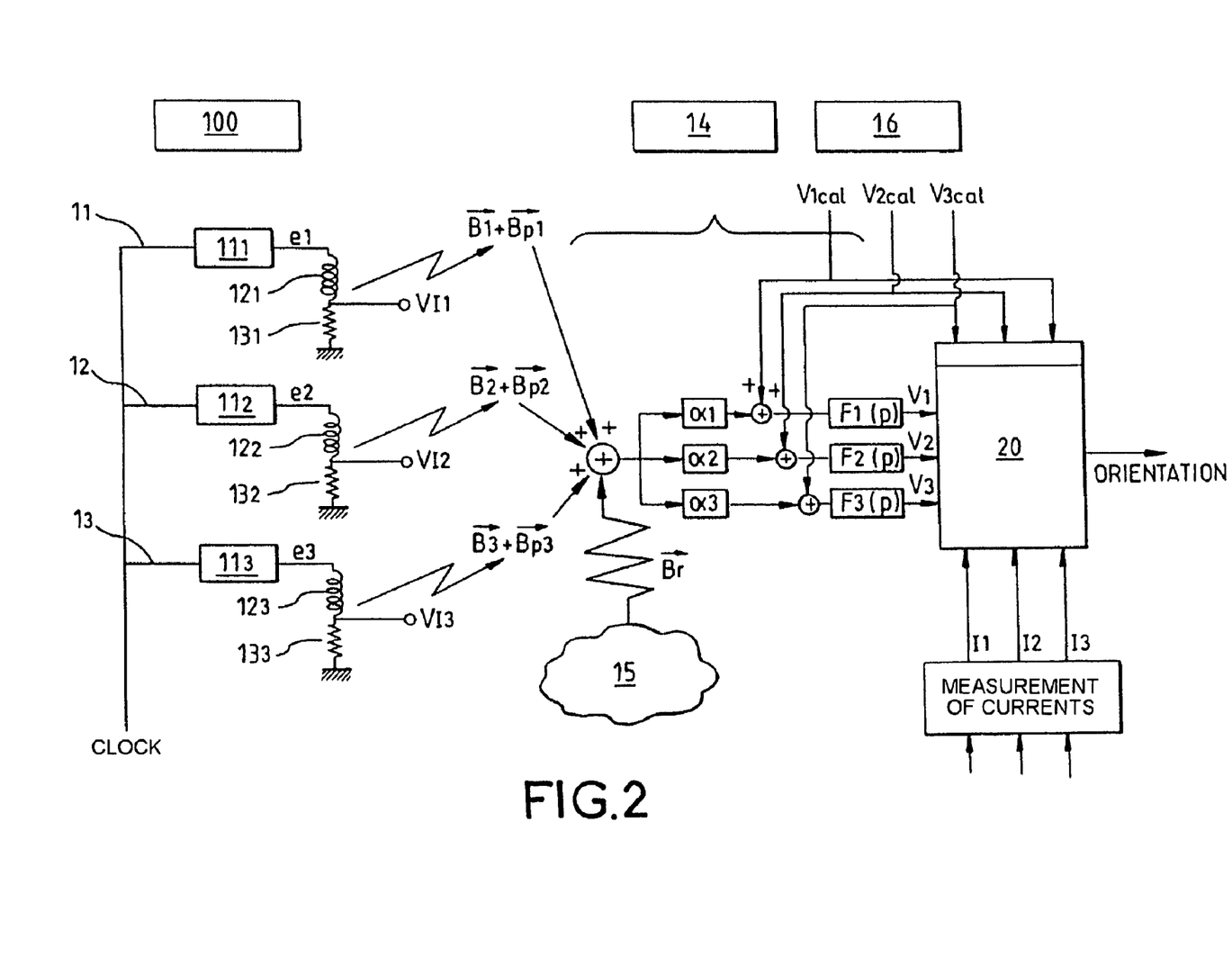
FIG. 2 is a schematic diagram of the architecture of such a device adapted to a disturbed magnetic environment.

FIG. 2 illustrates the basic architecture of a device as described hereinabove. We consider the general case of use in an environment of magnetic disturbances due for example to the presence of conducting bodies and/or of bodies of ferromagnetic type.

A block 1 for generating signals is made up of three channels $1_1$ to $1_3$. Each channel $1_1$ to $1_3$ comprises a generator $11_1$ to $11_3$ of current $i_{B1}$ to $i_{B3}$, a coil $12_1$ to $12_3$ and a resistor $13_1$ to $13_3$. The flow of the current in the coils $12_1$ to $12_3$ allows the creation of a magnetic field $B_1$ to $B_3$ respectively for each of the channels $1_1$ to $1_3$. The currents $i_{B1}$ to $1_{B3}$ injected into the coils $12_1$ to $12_3$ are preferably produced by current generators of internal impedance greater than 500 kΩ. According to a preferred mode of embodiment, the current generators $11_1$ to $11_3$ are connected to untuned coils. The invention applies of course also to the case where the current generators $11_1$ to $11_3$ are connected to tuned coils.

Magnetic disturbances, which arise in ferromagnetic materials and/or conducting materials surrounding the helmet viewfinder device illustrated in FIG. 1, are superimposed on the fields $B_1$ to $B_3$ in the form of disturbing magnetic fields $B_{p1}$ to $B_{p3}$.

The sensor 14 receives the sum of the fields $B_1$ to $B_3$ emitted respectively by the channels $1_1$ to $1_3$ of the block for generating the signals 1, of the disturbing fields $B_{p1}$ to $B_{p3}$, and of any radiated disturbances 15 $B_r$.

A block 16 for calibrating the sensor delivers the calibration signals $V_{1cal}$, $V_{2cal}$ and $V_{3cal}$.

On completion of the various processing operations applied to the fields received, the block 20 outputs the matrix $C_{ij}$ of the emitter-sensor couplings in free space, which makes it possible to calculate in a known manner the position and the orientation of the sensor 14 in the reference frame of the emitter 1 of the helmet viewfinder device.

The block 20 makes it possible:

to separate and measure the measurement and calibration electrical quantities (voltages and currents) by virtue of the fact that they are disjoint in terms of frequency;

to model the fields received by iterative techniques;

to identify the constant fields with the frequency making it possible to estimate the magnetic field emitted in free space by eliminating the disturbing fields;

to estimate the position and the orientation of the helmet sight carrying the sensor.

Figure 3:
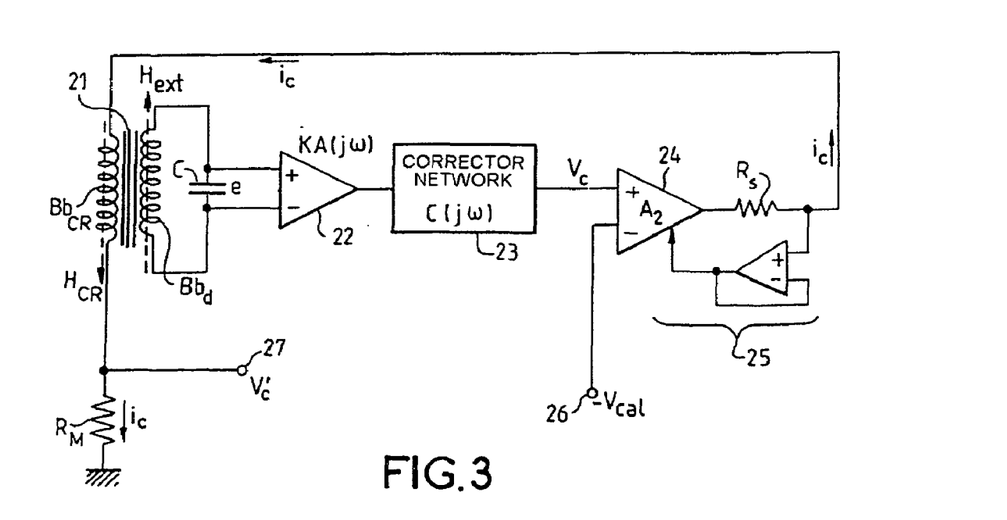
FIG. 3 is a basic diagram explaining a sensor channel according to the invention.

FIG. 3 is a more detailed diagram explaining the principle of a sensor channel of the device according to the invention.

We wish to measure the ambient magnetic induction $B_{ext}$ at the level of the sensor. To do this, we use, for each channel, a detection coil $Bb_d$ coiled at the same time as an associated feedback coil $Bb_{CR}$ around a common core 21 made of very permeable magnetic material ($\mu/\mu_0 \gg 1$). It is known that magnetic induction is related to the magnetic field by the relation $B_{ext} = \mu H_{ext}$. Across the terminals of the detection coil $Bb_d$ we measure the flux variation:

$$e = -\frac{d\phi}{dt} = -N_d S_d \frac{d(B_{ext} - B_{CR})}{dt}$$

where $N_d$ and $S_d$ represent the number of turns and their mean area. This measurement is performed with the aid of a servocontrol loop comprising an amplifier 22 with transfer function $KA(j\omega)$ receiving the voltage e tapped off from the terminals of a capacitor C added in order to greatly reduce the detection coil's inherent Q factor, a corrector network 23 making it possible to stabilize the servocontrol loop, an amplifier 24 of gain $A_2$, and a current generator 25 with a constant pure resistance $R_s$ which fixes the voltage/current transfer coefficient at the amplifier 24. The current generator 25 generates the feedback current $i_c$ which is injected into the feedback coil $Bb_{CR}$. This current $i_c$ is sent to ground through a measurement resistor $R_M$. On the terminal 27 is a measurement voltage $V'_c$ representing the value of the measurement current $i_c$. Finally, according to a characteristic of the invention, a calibration voltage $-V_{cal}$, applied to the terminal 26, is superimposed on the output voltage $V_c$ of the sensor channel, present at the input of the amplifier 24.

The feedback magnetic induction $B_{CR}$, produced by the injection of the current $i_c$, in the coil $Bb_{CR}$ may be written:

$$B_{CR} = N_{CR} \mu k_B i_c = \mu k_{CR} i_c$$

where $N_{CR}$ is the number of turns per unit length and $k_B$ is a constant dependent on the units used, with by definition $$H_{CR} = \frac{B_{CR}}{\mu} = k_{CR} i_c.$$

If the servocontrol operates correctly, we have $B_{ext} \cong B_{CR}$ and the voltage e tends to zero.

Figure 4:
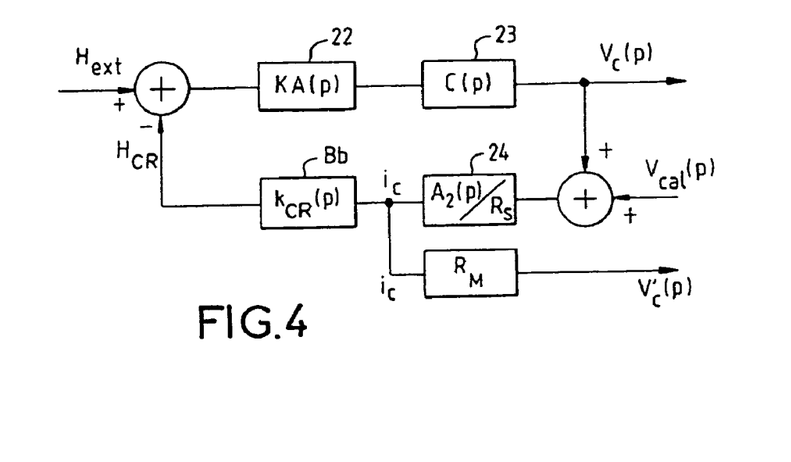
FIG. 4 is a representation of the channel of FIG. 3 using Laplace transforms.

Represented in FIG. 4 is the diagram of the channel of FIG. 3 using Laplace transforms of the time variables to pass to the transfer functions. To determine the transfer function as a function of the angular frequency, it suffices to put $p = j\omega$. In this representation, K is a constant static gain proportional to the product $N_d S_d \mu(p)$. $A_2(p)$ is the complex gain of the amplifier 24. As a function of the quality and hence of the cost of this amplifier, the gain may be constant throughout the operating band as a function of $\omega$, constant as a function of the environment or else non-constant.

As seen in the introduction, it is necessary to accurately ascertain the complex transfer functions of each of the channels of the sensor so as to obtain the values $H_{ext}$ which are the inputs that one seeks to measure. The voltage $V_{cal}$ is a secondary input that is appended to calibrate the system according to the invention.

By putting:

$$G(j\omega) = A(j\omega) C(j\omega)$$

$$R(j\omega) = k_{CR} \frac{A_2(j\omega)}{R_s}$$

we obtain:

$$T_v(j\omega) = \frac{KGR}{1 + KGR}$$

Now, we can write:

$$V_c(j\omega) = -T_v(j\omega) V_{cal}(j\omega) + T_v(j\omega)\left(\frac{H_{ext}(j\omega)}{R(j\omega)}\right) \quad (a)$$

$$V'_c(j\omega) = R_M \left[ \begin{array}{l} (1 - T_v(j\omega))\frac{A_2(j\omega)}{R_s} V_{cal}(j\omega) + \\ T_v(j\omega)\left(\frac{H_{ext}(j\omega)}{k_{CR}}\right) \end{array} \right] \quad (b)$$

As may be noted, by virtue of the superposition of calibration signals $V_{cal}(j\omega_{cal})$ at angular frequencies $\omega_{cal}$ different from the angular frequencies $\omega_u$ of the useful signals of $H_{ext}(j\omega_u)$ emitted by the emitter, we can separate the frequency terms (for example by FFT, standing for "Fast Fourier Transform", or by synchronous detection) and obtain the measurement of the transfer function $T_v(j\omega)$. Specifically, on the basis of equation (a) by isolating the terms of angular frequency $\omega_{cal}$, we have:

$$V_c(j\omega_{cal}) = -T_v(j\omega_{cal}) V_{cal}(j\omega_{cal})$$

We can then identify the estimated value of $T_v$:

$$\widehat{T_v(j\omega)} = F(V_c(j\omega_{cal}), V_{cal}(j\omega_{cal}), j\omega)$$

where F indicates an interpolation model such as a polynomial approximation.

On the basis of this estimated value we can isolate in relation (a) for the angular frequencies $\omega_u$:

$$V_c(j\omega_u) = \widehat{T_v(j\omega_u)} \frac{H_{ext}(j\omega_u)}{R(j\omega_u)}$$

hence $\widehat{H_{ext}(j\omega_u)} = R(j\omega_u) \dfrac{V_c(j\omega_u)}{\widehat{T_v(j\omega_u)}}$ The problem which then arises is that the term $$R(j\omega_u) = \frac{k_{CR}A_2(j\omega_u)}{R_s}$$

is not identified. Specifically $k_{CR}$ is regarded as constant and identifiable in the factory since, being dimensionally equivalent to a number of turns per unit length, it is time-invariant and independent of the temperature and environmental conditions. On the other hand, this is not the case for the resistance $R_s$ or for the gain $A_2$. Now, these components condition the accuracy of the parameters that one seeks to measure.

It is therefore necessary to provide a device having suitable calibration to determine these components in each channel.

Figure 5:
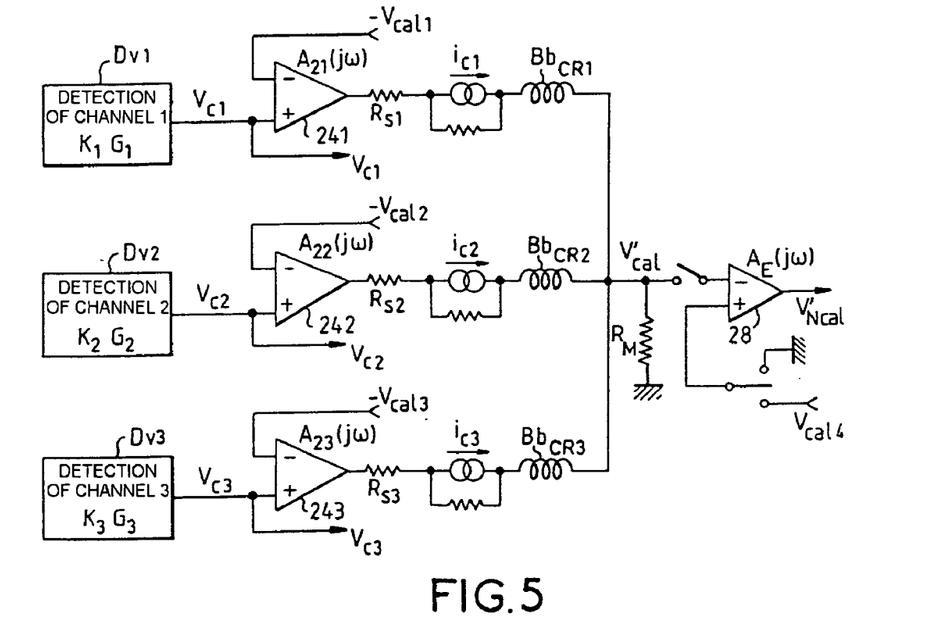
FIG. 5 is a simplified diagram of the sensor according to the invention considering only the determination of the transfer function of each channel.

FIG. 5 illustrates a simplified diagram making it possible to identify certain important elements of each channel of the sensor.

Using the indices 1 to 3 for the three channels of the sensor corresponding to three orthogonal detection coils, the amplifier 22/corrector 23 assembly of FIG. 4 has been shown diagrammatically by a block, respectively Dv1 to Dv3, providing an output voltage $V_{c1}$ to $V_{c3}$. The assembly 24 of FIG. 4 is shown diagrammatically by an amplifier 241 to 243 of gain $A_{21}(j\omega)$ to $A_{23}(j\omega)$, a resistance $R_{s1}$ to $R_{s3}$ and a current generator providing the feedback current $i_{c1}$ to $i_{c3}$ to the feedback coils $Bb_{CR1}$ to $Bb_{CR3}$. A measurement resistor $R_M$ makes it possible to address the measurement voltage $V'_{cal}$ to an acquisition path including the amplifier 28 of gain $A_E(j\omega)$ and which provides, after processing, a digitized value $V'_{Ncal}$ at output. A second input of the amplifier 28 is either grounded, or receives a calibration value $V_{cal4}$. Calibration voltages $-V_{cal1}$ to $-V_{cal3}$ are applied to the inverse inputs of the amplifiers 241 to 243.

In the factory, the output voltages $V_{c1}$ to $V_{c3}$ are grounded. Denoting by i the index of the channels of the sensor, we alternately apply $V_{cali}=V_{cal}(j\omega_{cal})$ to the input of each channel while the calibration inputs of the other channels are grounded. We have:

$$V'_{cal}(j\omega_{cal}) = R_M\left(\frac{V_{cali} \cdot A_{2i}(j\omega_{cal})}{R_{si}}\right)$$

from which we deduce $$\frac{R_M}{R_{si}}A_{2i}(j\omega)$$

for each channel. However if the gain $A_{2i}(j\omega)$ varies in problematic proportions, we must then call upon the combination of relations (a) and b) above. As already mentioned, (a) provides $$\widehat{T_v(j\omega)}.$$

By performing the frequency separation of the signals according to the angular frequency $\omega_u$ or $\omega_{cal}$, relation (b) yields:

$$V'_c(j\omega_{cal}) = R_M(1 - T_v(j\omega_{cal}))\frac{A_2(j\omega_{cal})}{R_s}V_{cal}(j\omega_{cal})$$

hence:

$$A_2(j\omega_{cal})\frac{R_M}{R_S} = \frac{1}{1 - \widehat{T_v(j\omega_{cal})}}\frac{V'_c(j\omega_{cal})}{V_{cal}(j\omega_{cal})}$$

and as:

$$\widehat{T_v(j\omega_{cal})} = -\frac{V_c(j\omega_{cal})}{V_{cal}(j\omega_{cal})}$$

we obtain:

$$A_2(j\omega_{cal})\frac{R_M}{R_S} = \frac{V'_c(j\omega_{cal})}{V_{cal}(j\omega_{cal}) - V_c(j\omega_{cal})}$$

From this we deduce $$\widehat{A_2(j\omega)\frac{R_M}{R_S}}$$

by polynomial approximation in the same manner as for $$\widehat{T_v(j\omega)}.$$

However, this solution makes it possible to take account of the aging over time of the components involved, but if the parameters $A_2$, $R_M$, $R_{si}$ vary during the mission as a function of temperature, this solution requires that the measurements be stopped in order to perform the calibration ($V_{ci}$ grounded), this being contrary to the aim sought in the invention. This leads us therefore to the diagram, in accordance with the principle of FIG. 3, described in FIG. 6 but where $i_{c1}$ to $i_{c3}$ represent the sum of the currents, one produced by the voltage of the sensor $V_{ci}$ and the other by the calibration voltage. In this diagram, the output quantity is the voltage $V'_{ci}$ instead of $V_{ci}$.

Figure 6:
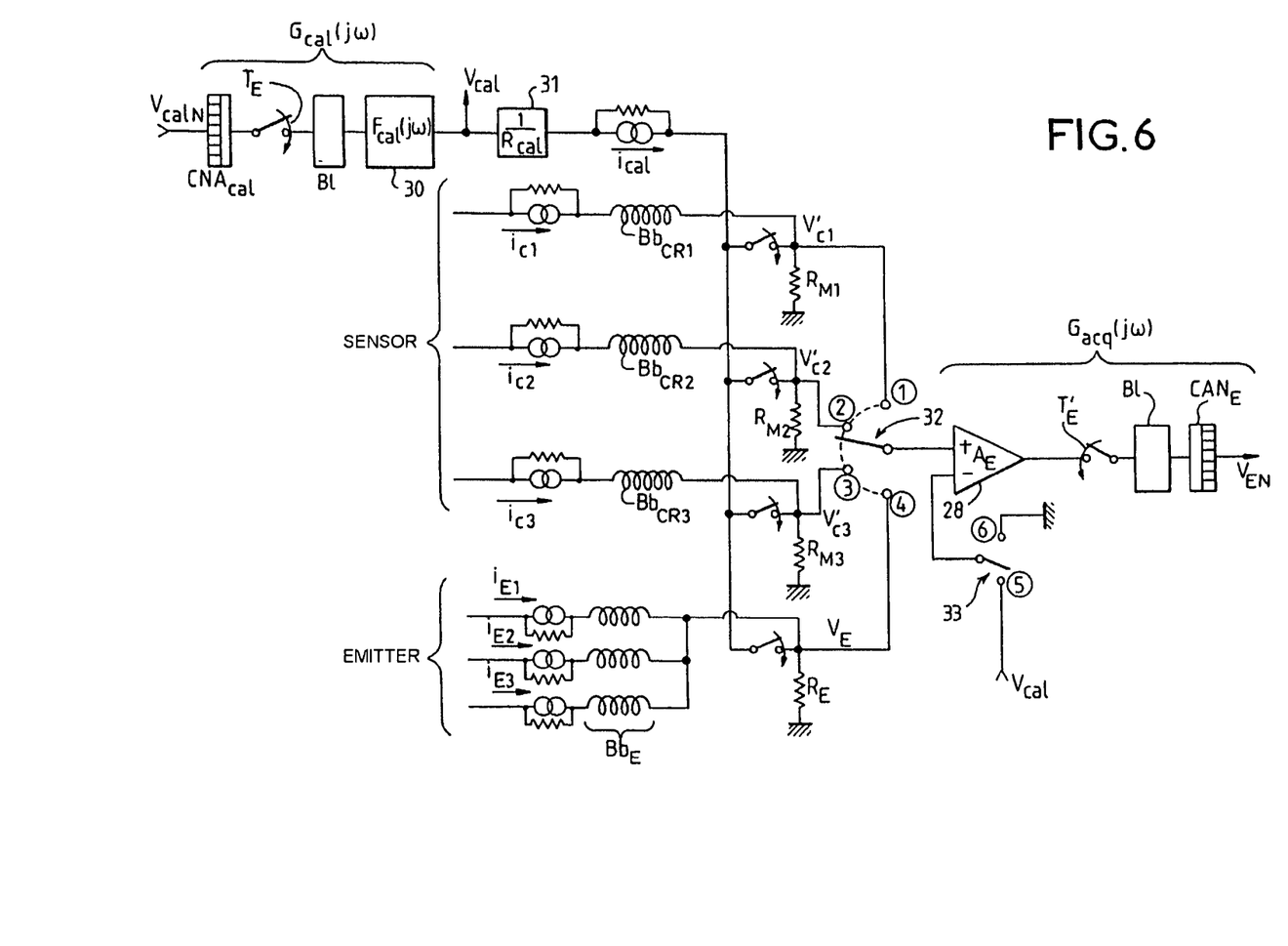
FIG. 6 is a diagram taking account moreover of the identification of the variable components of the sensor.

If it is considered that, in each emission coil of index j (with j taking the values 1 to 3), there flows an emission current of angular frequencies $\omega_{j,k_j}$ where $k_j$ varies from $K_j$ to $K_j$max, all these angular frequencies being mutually distinct and distinct from the calibration angular frequencies $\omega_{cal}$, we can write on the basis of relation (b) for sensor channel i:

$$V'_{ci}(j\omega_{j,k_j}) = R_{Mi}\left[\widehat{T_v(j\omega_{j,k_j})}\right]\frac{H_{exti}(j\omega_{j,k_j})}{k_{CR}}$$

i.e.:

$$V'_{ci}(j\omega_{j,k_j}) = \frac{R_{Mi}}{k_{CRi}}\left[\widehat{T_v(j\omega_{j,k_j})}\right] i_{Ej}(j\omega_{j,k_j}) H_{ext\,i\,Norm}(j\omega_{j,k_j}) \quad 5$$

where: $H_{ext\,i\,Norm}$ is the normalized value of the field emitted for an emission current of 1 ampere.

In the subsequent description and for simplicity the useful angular frequencies $\omega_{j,k_j}$ will no longer be denoted but we shall simply denote $\omega_u$ just as we denote $\omega_{cal}$ for the calibration angular frequencies, given that all these angular frequencies are distinct and frequency-separable.

As may be seen in the last relation hereinabove giving $V'_{ci}$, it will be possible to accurately ascertain $H_{ext\,Norm}$ on condition that $R_{Mi}$ and $i_{Ej}$ are identified. To do this, we refer to the modified diagram of FIG. 6, where we find, partially, the three emission channels of the emitter and the three sensor channels. We have, moreover, detailed a calibration channel and the common acquisition channel. The calibration channel comprises in series a digital/analog converter $CNA_{cal}$, a sample- and hold module Bl with period $T_E$, a filter 30 with transfer function $F_{cal}(j\omega)$ providing a calibration voltage $V_{cal}$ on the basis of the digital value $V_{calN}$, the whole of this chain having a transfer function $G_{cal}(j\omega)$. A calibration current $i_{cal}$ is provided on the basis of the voltage $V_{cal}$ with the aid of a resistor $R_{cal}$ and of a current generator.

The acquisition channel, with transfer function $G_{acq}(j\omega)$, comprises an amplifier 28 of gain $A_E$, a hold module Bl and an analog/digital converter $CAN_E$ to provide a measurement digital voltage value $V_{EN}$. The direct input of the amplifier 28 is linked by a switch 32 to one of the contacts 1 to 4, making it possible to link in multiplex mode the acquisition channel to the measurement voltage of one of the three sensor channels or of the sum of the three emission channels. The inverse input of the amplifier 28 is linked by a switch 33 either to ground 6, or by the contact 5 to the calibration voltage $V_{cal}$. By connecting the amplifier 28 only to ground via the contact 6, it is possible to measure the acquisition chain's own noise.

After a calibration cycle where $V_{cal}$ is injected via the contact 5, then where the current $i_{cal}$ is injected sequentially onto the measurement resistors $R_{M1}$ to $R_{M3}$ and $R_E$, the following measurements are available:

$$V_{EN}^{(5)}(j\omega) = G_{acq}(j\omega)\, G_{cal}(j\omega)\, V_{calN}(j\omega) \quad (c)$$

$$V_{EN}^{4}(j\omega) = G_{acq}(j\omega)\, R_E \begin{bmatrix} i_{E1}(j\omega_{u1}) + i_{E2}(j\omega_{u2}) + \\ i_{E3}(j\omega_{u3}) + \\ G_{cal}(j\omega_{cal})\dfrac{V_{calN}(j\omega_{cal})}{R_{cal}} \end{bmatrix} \quad (d)$$

$$V_{EN1}^{(1)}(j\omega) = G_{acq}(j\omega)\, R_{M1}\left[i_{c1} + G_{cal}(j\omega_{cal})\frac{V_{calN}(j\omega_{cal})}{R_{cal}}\right] \quad (e.1)$$

$$V_{EN2}^{2}(j\omega) = G_{acq}(j\omega)\, R_{M2}\left[i_{c2} + G_{cal}(j\omega_{cal})\frac{V_{calN}(j\omega_{cal})}{R_{cal}}\right] \quad (e.2)$$

$$V_{EN3}^{3}(j\omega) = G_{acq}(j\omega)\, R_{M3}\left[i_{c3} + G_{cal}(j\omega_{cal})\frac{V_{calN}(j\omega_{cal})}{R_{cal}}\right] \quad (e.3)$$

It is clear that the currents $i_{c1}$, $i_{c2}$ and $i_{c3}$ contain all the components at the angular frequencies $\omega_{1,k_1}$ to $\omega_{3,k_3}$ that are mutually distinct and distinct from the components at the angular frequencies $\omega_{cal}$. It is therefore possible to separate them from one another. Thus the right-hand side of equation (d) can be subdivided into two terms $$G_{acq}(j\omega_u)\, R_E \sum_j i_{Ej}(j\omega_{uj})$$

that will be designated by $$V_{ENI}^{(4)} \text{ and } G_{acq}(j\omega_{cal})\, R_E\, G_{cal}(j\omega_{cal})\left[\frac{V_{calN}(j\omega_{cal})}{R_{cal}}\right]$$

that will be designated by $$V_{ENcal}^{(4)}.$$

The same notation will be used for relations (e.1) to (e.3) which will be written with two terms $V_{ENil}^{(i)}$ and $V_{ENcal}^{(i)}$.

Finally relation (c) will have just a single term written $V_{ENcal}^{(5)}$.

From all these relations we easily deduce that:

$$\frac{R_E}{R_{cal}} = \frac{V_{ENcal}^{(4)}}{V_{ENcal}^{(5)}} \cdot \frac{R_{M1}}{R_{cal}} = \frac{V_{EN1cal}^{(1)}}{V_{ENcal}^{(5)}} \cdot \frac{R_{M2}}{R_{cal}} = \frac{V_{EN2cal}^{(2)}}{V_{ENcal}^{(5)}} \cdot \frac{R_{M3}}{R_{cal}} = \frac{V_{EN3cal}^{(3)}}{V_{ENcal}^{(5)}}$$

hence:

$$\frac{R_{M1}}{R_E} = \frac{V_{EN1cal}^{(1)}}{V_{ENcal}^{(4)}}$$

and similar relations for $$\frac{R_{M2}}{R_E} \text{ and } \frac{R_{M3}}{R_E}.$$

As we have seen, for $\omega_{uj}$:

$$V_{ENil}^{(i)} = G_{acq} R_{Mi} i_{ci}$$

Now, from (b) we derive, again for $\omega_{uj}$:

$$i_{ci} = \widehat{T_{vi}}\, \frac{H_{ext\,i}}{k_{CRi}}$$

i.e.:

$$V_{ENil}^{(i)} = G_{acq} R_{Mi}\, \frac{i_{Ej}}{k_{CRi}}\, H_{ext\,i\,Norm}\, \widehat{T_{vi}} \quad (g)$$

From relation (d) for $\omega_{uj}$, we obtain:

$$V_{ENI}^{(4)} = G_{acq} R_E i_{Ej} \quad \text{(h)}$$

Combining (g) and (h), we have:

$$V_{ENil}^{(i)} = \widehat{\frac{R_{Mi}}{R_E}} \frac{V_{ENI}^{(4)}}{k_{CRi}} \widehat{T_{vi}} H_{ext\,i\,Norm} \quad \text{(i)}$$

the ratios $$\frac{R_{Mi}}{R_E}$$

are identified by relations (f), hence:

$$V_{ENI}^{(i)}(j\omega_{uj}) = \left(\widehat{\frac{V_{ENiCAL}^{(i)}}{V_{ENcal}^{(4)}}}\right) \frac{V_{ENI}^{(4)}(j\omega_{uj})}{k_{CRi}} \widehat{T_{vi}}(j\omega_{uj}) H_{ext\,i\,Norm} \quad \text{(j)}$$

these terms $V_{ENI}^{(i)}(j\omega_{uj})$ form a matrix with nine terms, which depend only on $k_{CRi}$ since all the other factors are identified. In fact, $k_{CRi}$ may be regarded as invariant for the three channels of the sensor.

Hence, from relation (j) we derive the expression for the desired outputs:

$$H_{ext\,i}(j\omega_{uj}) = A^{-1} B^{-1} \widehat{T_{vi}^{-1}}(j\omega_{uj}) \quad \text{(k)}$$

with $$T_v^{-1} = \frac{1}{\rho_T} e^{-j\phi_T}$$

if we write $T_V$ in the conventional complex form $T_v(j\omega) = \rho_T(j\omega)e^{j\phi_T(j\omega)}$ $$A^{-1} = \frac{V_{ENcal}^{(4)}}{V_{ENical}^{(i)}}$$

frequency-constant $$B^{-1} = k_{CRi} \frac{1}{\rho_j} e^{-j\phi_j}$$

if $$V_{ENIj}^{(4)}(j\omega_{uj}) = \rho_j(j\omega_{uj}) e^{j\phi_j(j\omega_{uj})}$$

Thus, the final relation (k) shows that we have indeed compensated for the measurement of the magnetic field with the aid of the inverse of the transfer function of the channel of the sensor.

The embodiment of FIG. 6 that has just been analyzed is based on the use of a single acquisition channel for all the measurements, this having an obvious advantage of simplicity.

However, this presupposes its use according to a sampling sequence with a period $T'_E$ such that:

$$T'_E = \frac{T_E}{N_a}$$

where $N_a$ is the number of different channels to be acquired during the period $T_E$.

Figure 7:
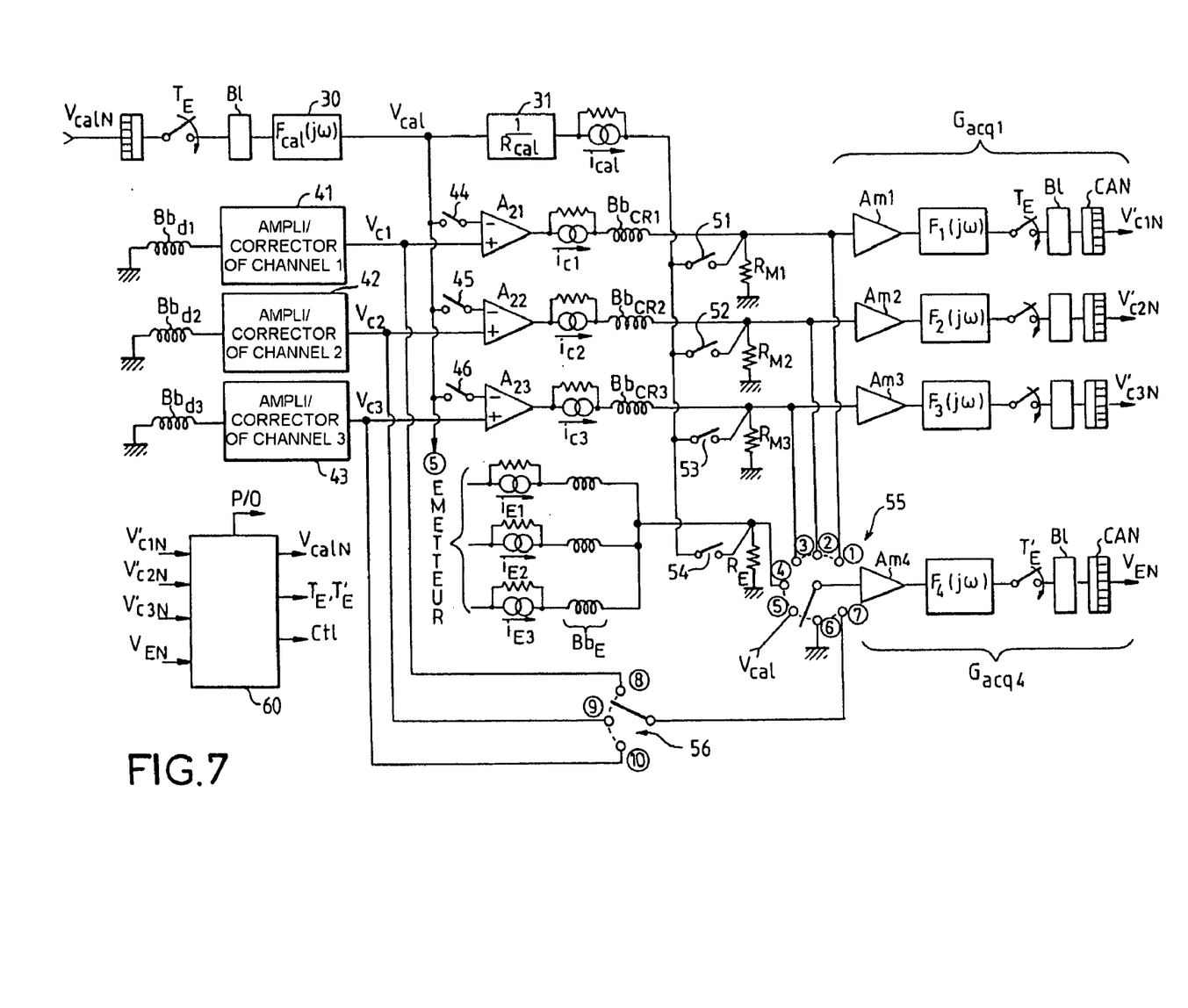
FIG. 7 is the diagram of a practical embodiment of a magnetic measurement device according to the invention.

If the response time of $G_{acq}(j\omega)$ is too long with respect to $T'_E$, it will then be necessary to adopt the diagram of the embodiment of FIG. 7.

In this FIG. 7, four acquisition channels with amplification/filtering must be provided:

three acquisition channels for the measurement currents $i_{ci}$ operating with the period $T_E$ in a continuous manner (if it is fast enough, it is possible to use just a single converter CAN multiplexing the three filtered and sampled/held channels at the same instant);

a multiplexed acquisition channel operating only on the calibration at a low rate, this not being problematic for identifying slowly varying parameters.

The three sensor channels therefore each comprise, as already described, a detection coil, $Bb_{d1}$ to $Bb_{d3}$, an amplifier/corrector assembly, 41 to 43, providing the output voltage $V_{c1}$ to $V_{c3}$, an amplifier $A_{21}$ to $A_{23}$ receiving the output voltage on an input and the calibration voltage via a switch 44 to 46 on the other input, a feedback current generator $i_{c1}$ to $i_{c3}$, a feedback coil $Bb_{CR1}$ to $Bb_{CR3}$ and a resistor $R_{M1}$ to $R_{M3}$ for measuring the feedback current on which it is possible to superpose the calibration current $i_{cal}$ via a switch 51 to 53. To each of the channels of the sensor there corresponds a measurement acquisition channel $G_{acq1}$ to $G_{acq3}$ comprising an amplifier $A_{m1}$ to $A_{m3}$, a filter $F_1(j\omega)$ to $F_3(j\omega)$, a hold module Bl and an analog/digital converter CAN so as to provide the digitized measurement voltage $V'_{C1N}$ to $V'_{C3N}$. Moreover, the emitter channels partially represented are connected so as to send the emission currents $i_{E1}$ to $i_{E3}$ to a measurement resistor $R_E$ on which may also be superposed the calibration current by the switch 54, this resistor being linked to the contact 4 of a switch 55. This switch 55 makes it possible to link the input of a fourth acquisition channel, multiplexed but otherwise similar to the first three channels, to the measurement voltages on the measurement resistors via the contacts 1 to 4, to the calibration voltage via the contact 5, to the ground via the contact 6 and to the output voltages of the three sensor channels via the contact 7 and the switch 56.

All the digitized measurement values are sent to a processor 60 which performs the various measurement and calibration and frequency-separation operations mentioned in the relations above and deduces therefrom the position and the orientation P/O of the sensor, while providing the control signals Ctl necessary for the operation of the assembly and the calibration value $C_{calN}$ and the periods $T_E$ and $T'_E$.

Thus, it may be seen that, by way of the switch 56, of the acquisition channel $G_{acq4}$ and of the contacts 7 and 5 of 55, it is possible to determine $$\widehat{T_{v1}}, \widehat{T_{v2}} \text{ and } \widehat{T_{v3}}$$

according to relation (a). Moreover, the acquisition channel $G_{acq4}$ makes it possible to calibrate, according to relation (f), the values $$\frac{R_{M1}}{R_E} \text{ to } \frac{R_{M3}}{R_E}.$$

The acquisition and calibration cycles above are independent of the cycles of the continuous measurement of the currents flowing through $R_{M1}$ to $R_{M3}$ via the first three channels.

With respect to FIG. 6, it is noted that there are three acquisition channels $G_{acqi}$ i from 1 to 3, that are mutually distinct and also different from the calibration channel $G_{acq4}$. It is shown hereinbelow that the configuration of FIG. 7 completely solves the problem raised. The various equations available are as follows:

Calibration:
switch 55, measurements (1), (2), (3), (4):

$$V_{ENcal}^{(4)} = \frac{R_E}{R_{cal}} G_{acq4} V_{cal} \qquad (l)$$

$$V_{ENcal}^{(i)} = \frac{R_{Mi}}{R_{cal}} G_{acq4} V_{cal} \text{ for } i = 1 \text{ to } 3 \qquad (m)$$

From this we deduce:

$$\frac{R_{Mi}}{R_E} = \frac{V_{ENcal}^i}{V_{ENcal}^{(4)}} \text{ for } \omega = \omega_{cal}$$

measurements of the channels $V'_{ciN}$ $$V'_{ciNcal} = G_{acqi} \frac{R_{Mi}}{R_{cal}} V_{cal} \text{ for } i = 1 \text{ to } 3 \qquad (n)$$

Combining (m) and (n) we obtain:

$$\frac{G_{acqi}}{G_{acq4}} = \frac{V'_{ciNcal}}{V_{ENcal}^{(i)}} \text{ for } \omega = \omega_{cal} \qquad (o)$$

From these expressions we deduce the estimates via approximation functions in the frequency domain as described previously for:

$$\widehat{\frac{G_{acqi}}{G_{acq4}}} \text{ and } \widehat{\frac{R_{Mi}}{R_E}},$$

the latter being frequency-invariant

Measurements:
For the useful frequencies to be measured $\omega = \omega_{uj}$, we have measurements for i from 1 to 3:

$$V_{ciN} = G_{acqi} \cdot R_{Mi} \cdot T_{vi} \cdot \frac{H_{exti}}{k_{CRi}} \qquad (p)$$

$$V_{ciN} = G_{acqi} \cdot R_{Mi} \cdot T_{vi} \cdot \frac{H_{exti norm}}{k_{CRi}} \cdot i_{Ej}$$

$$V_{ciN} = \frac{G_{acqi}}{G_{acq4}} \cdot \frac{R_{Mi}}{R_E} \cdot T_{vi} \cdot \frac{H_{exti norm}}{k_{CRi}} \cdot V_{ENlj}^{(4)}$$

$$H_{exti norm} = k_{CRi} \left( \frac{G_{acqi}}{G_{acq4}} \cdot \frac{R_{Mi}}{R_E} \cdot T_{vi} \cdot V_{ENlj}^{(4)} \right)^{-1} V_{ciN} \qquad (q)$$

It is appreciated that in this expression the term between brackets is deduced entirely from the calibrations, $k_{CRi}$ being regarded as known and constant. The intended aim has thus been achieved: measurement in continuous mode and calibration of all the parameters of the measurement without interruption of the measurement.

Of course, the exemplary embodiments described are in no way limiting of the invention. Thus, no account has been taken, in the sequel of the description, of the disturbing fields mentioned in relation to FIG. 2. It is obvious that these disturbing fields may be eliminated by the method alluded to, based on the variations as a function of frequency, but which does not form part of the present invention.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of magnetic measurement of the position and the orientation of a mobile object with respect to a fixed structure, in which a first emitter assembly includes at least two orthogonal coils for emitting magnetic fields, integral with said fixed structure, which define a reference frame, and means of emission for injecting predetermined emission currents into said coils at first frequencies, in which a second sensor assembly includes at least two orthogonal coils for detecting magnetic fields, integral with said mobile object, sensor channels with servocontrol loops for producing in feedback coils coupled to said detection coils feedback magnetic fields by injection of measurement currents and a calibration channel for elaborating at least one calibration voltage, and in which at least one acquisition channel is provided for extracting measurement values of said emission channels, said sensor channels and said calibration channel and means of calculation and of processing estimate, on the basis of said measurement values, the magnetic fields detected in the second sensor assembly and deduce therefrom the position and the orientation of said mobile object in said reference frame, wherein the calibration voltage comprises only terms with at least two frequencies distinct from said first frequencies and comprising:
    injecting calibration currents and voltages into said channels of the sensor so as to produce calibration measurement values identified by their frequency,
    estimating by the means of calculation the transfer function of each of the sensor channels;

deducing by said means of calculation the magnetic fields detected on the basis of said measurement values and of the inverse of said estimated transfer functions; and outputting a signal representing the position and orientation of the mobile object based on the deduced magnetic fields.

2. The method as claimed in claim 1, wherein the servo-control loops of the sensor channels provide output voltage ($V_{c1}$ to $V_{c3}$) producing said measurement currents and said measurement currents flow through measurement resistors ($R_{M1}$ to $R_{M3}$) so as to provide measurement voltages ($V'_{c1}$ to $V'_{c3}$), wherein the calibration voltage is superimposed on said output voltages for the production of said measurement currents, and in that said step of estimating the transfer functions is performed, on the basis of the separation of the calibration frequency terms in said output voltages, by polynomial approximation for said first frequencies.

3. The method as claimed in claim 2, wherein the calibration currents are injected onto said measurement resistors and the value of the variable components of said channels of the sensors is identified on the basis of the separation of the calibration frequency terms in the output voltages and the measurement voltages.

4. The method as claimed in claim 3, wherein the separation of the calibration frequency terms and the measurement thereof is performed with the aid of a separate acquisition channel multiplexed in time so as to process during a calibration cycle the measurement voltages of the sensor channels, the emission currents, the calibration channel and the output voltages of the sensor channels.

5. A device for the magnetic measurement of the position and the orientation of a mobile object with respect to a fixed structure, comprising:

a first emitter assembly including at least two orthogonal coils for emitting magnetic fields, integral with said fixed structure and defining a reference frame, and means of emission for injecting predetermined currents into said coils at first frequencies and constituting with said coils at least two emission channels;

a second sensor assembly including at least two orthogonal coils for detecting magnetic fields, integral with said mobile object, means of measurement by servo-control loops, for producing in feedback coils coupled to said detection coils feedback magnetic fields by injection of measurement currents and for constituting with said detection coils at least two sensor channels, and means of calibration comprising a calibration channel for elaborating at least one calibration voltage at second frequencies;

at least one acquisition channel for measurements for extracting measurement values of said emission channels, said sensor channels and said calibration channel; and means of calculation and processing for estimating, on the basis of said measurement values, the magnetic fields detected in the second sensor assembly and deducing therefrom the position and the orientation of said mobile object in said reference frame, wherein said second frequencies are distinct from said first frequencies, in that said means of calibration are provided so as to inject calibration currents and voltages into said sensor channels so as to produce calibration measurement values identified by their frequencies and addressed to said means of calculation by acquisition channel or channels and in that said means of calculation and processing are provided so as to estimate the transfer function of each of the sensor channels and to deduce the magnetic fields detected from said measurement values and from the inverse of said estimated transfer functions.

6. The device as claimed in claim 5, wherein the said sensor channels each comprise a feedback coil coiled onto the same magnetic core as the associated detection coil, corrector amplifier means for generating on the basis of the signal at the terminals of the detection coil an output voltage, and amplifier/current generator means for elaborating a feedback current injected into the associated feedback coil and a feedback current measurement resistor traversed by said current so as to provide a measurement voltage, wherein the means of calibration furthermore comprise first means of injecting the calibration voltage onto said amplifier/current generator means and second means for injecting a calibration current proportional to said calibration voltage onto said measurement resistors.

7. The device as claimed in claim 6, wherein said acquisition channels comprise first acquisition channels for processing in continuous mode said measurement voltages respectively of each sensor channel, a sampled acquisition channel for processing in time multiplex mode the calibration signals present in said output voltages of the sensor channels, in the measurement voltages of these same channels and in the sum of the emission currents, and said emission currents; and means of multiplexing for applying said signals processed by the sampled acquisition channel onto the input of the latter.

* * * * *